(12) United States Patent
Khaleghi et al.

(10) Patent No.: US 7,136,483 B2
(45) Date of Patent: Nov. 14, 2006

(54) MOBILE TERMINAL MODE CONTROL IN HIGH DATA RATE CDMA SYSTEM

(75) Inventors: Farideh Khaleghi, San Diego, CA (US); Patrik Lundqvist, Encinitas, CA (US); Shiau-He Tsai, San Diego, CA (US)

(73) Assignee: Telefonaictiebolaget LM Ericsson (publ) (SE)

( * ) Notice: Subject to any disclaimer, the term of this patent is extended or adjusted under 35 U.S.C. 154(b) by 1065 days.

(21) Appl. No.: 10/202,570

(22) Filed: Jul. 24, 2002

(65) Prior Publication Data

US 2004/0017792 A1 Jan. 29, 2004

(51) Int. Cl.
*H04L 12/413* (2006.01)
(52) U.S. Cl. ..................... 379/448; 370/310
(58) Field of Classification Search .............. 370/310, 370/310.2, 328, 329, 332, 338, 341, 349, 370/320, 335, 342, 441
See application file for complete search history.

(56) References Cited

U.S. PATENT DOCUMENTS

| 5,708,656 A | * | 1/1998 | Noneman et al. ........... 370/335 |
| 6,219,343 B1 | * | 4/2001 | Honkasalo et al. ......... 370/335 |
| 6,356,531 B1 | | 3/2002 | Soliman |

* cited by examiner

*Primary Examiner*—Brenda Pham
(74) *Attorney, Agent, or Firm*—Coats & Bennett, P.L.L.C.

(57) ABSTRACT

Mobile terminals in a high data rate CDMA system may be placed in a control hold mode wherein reverse link control channels are gated, or transmitted at a reduced duty cycle. Mode decisions are based on the activity of the mobile terminal in both the forward and reverse links. A forward link inactivity timer is maintained at the base station that schedules forward link communications to a mobile terminal. The reverse link inactivity timer may be maintained at the same base station, at a different base station in the mobile terminal's active set, or at the base station controller. The forward link inactivity timer may follow the mobile terminal's selection of best forward link serving base station in handoff. When both the forward and reverse link inactivity timers have expired, and no forward link data is pending, the mobile terminal may be commanded to a control hold mode.

18 Claims, 4 Drawing Sheets

MOBILE TERMINAL MODE CONTROL IN HIGH DATA RATE CDMA SYSTEM

BACKGROUND OF THE INVENTION

The present invention relates generally to the field of wireless communications and specifically to methods for controlling the operational mode of mobile terminals in a wireless communication system.

Numerous access schemes exist to allow multiple users to share a communication medium. One such access scheme is known as Code Division Multiple Access (CDMA). In CDMA systems, multiple users share the same carrier frequency and may transmit simultaneously. Each user has its own pseudo-noise (PN) sequence, which is approximately orthogonal to the PN sequences of other users. Transmissions to or from individual users are imprinted with that user's PN sequence. The receiver selects the desired signal, which combines in the communication with unwanted signals, by correlating the received signal with the PN sequence of the desired signal. All other signals are spread by the PN sequence and appear as noise to the receiver.

CDMA systems are interference-limited systems. Since all mobile terminals operate at the same frequency, internal interference generated within the system plays a critical role in determining system capacity and voice quality. The transmit power from each mobile terminal must be controlled to limit interference while maintaining desired performance objectives, e.g., bit error rate (BER), frame error rate (FER), capacity, dropped-call rate, coverage, etc. Normally a mobile terminal transmits a pilot signal continuously on a reverse pilot channel (R-PICH) to enable closed loop power control by the network.

In some implementation of cdma2000, such as 1xEV-DV and 1xEV-DO systems, the forward link is time-multiplexed and transmitted at the full power available to the base station, but with data rates and slot times that vary depending on forward link channel conditions. The data rate that can be supported by the forward link is proportional to the Signal to Noise Ratio (SNR), which changes continuously. The mobile terminal measures the instantaneous SNR of the pilot signal received from each base station in its active set and requests service from the base station providing the strongest signal. The mobile terminal transmits the SNR value, or equivalently the supportable data rate, for the base station providing the strongest signal on a reverse control channel referred to generically herein as the rate control channel.

It has been proposed to reduce interference and hence increase system capacity by introducing a control hold state for mobile terminals with low transmit activity factors. In the control hold state, the mobile terminal suspends or reduces transmissions on many of the reverse link channels, such as a reverse rate control channel or reverse pilot channel. Gating or suspending transmission on the reverse link channels reduces interference, thus increasing the reverse link throughput and capacity. It also results in lower power consumption at the mobile terminal and thus increased battery life.

One method for identifying which mobile terminals should be placed in a control hold state exploits the phenomenon known as temporal locality. Communications to and from a particular user tend to be grouped in time. A mobile terminal that has very recently sent or received a transmission is more likely to receive or send another transmission in the near term, than is a mobile terminal that has not sent or received a transmission for some time. Following this principle, mobile terminals that have recently successfully received or sent transmissions are maintained in an active mode, and those to and from whom no transmissions have been directed for a predetermined time are commanded to enter a control hold state. A straightforward manner of implementing this approach is to maintain countdown timers for each transmission direction, which are loaded with a predetermined value and started upon each successful transmission. Such timers are referred to herein as the forward link inactivity timer and the reverse link inactivity timer. If an inactivity timer counts down to zero before another transmission in its respective direction, it is said to have expired, or timed-out. If both the forward link and the reverse link inactivity timers for a particular mobile terminal have expired, and if there is no data queued awaiting transmission to that mobile terminal, the network may command the mobile terminal to transition to the control hold state. Traditionally, a base station controller (BSC) in the network maintains and manages both inactivity timers, and controls the operational modes of the mobile terminals.

In some cdma2000 networks, such as 1xEV-DV and 1xEV-DO systems, the forward link is a time-shared channel and the base station transmits to only one mobile terminal at any given time. In systems of this type, a scheduler is usually maintained at each base station to schedule forward link transmissions for all mobile terminals served by that base station. When the serving base station schedules data packets for transmission to a mobile terminal, however, the forward link inactivity timer maintained at the BSC may not be started or reset at the proper time due to scheduling delays at the serving base station, or signaling delays between the base station and the BSC, and thus may not accurately reflect the timing of the last forward link transmission to the mobile terminal. This problem may be further complicated by the fact that, in soft handoff, the mobile terminal may select a different base station in its active set as its forward link serving base station, based on received signal quality. This further complicates the synchronization of message scheduling to the mobile terminal at the base station and the state of the forward link inactivity timer at the base station controller.

SUMMARY OF THE INVENTION

The present invention relates to a method of controlling the operational modes of mobile terminals in a wireless communication system, based on their activity in both the forward and reverse links. The method comprises maintaining a forward link inactivity timer and a reverse link inactivity timer. The forward link inactivity timer is located at a serving base station that schedules forward link communications to a mobile terminal. The reverse link inactivity timer is preferably located at a base station controller that controls the operating mode of the mobile terminal, or at a serving base station. Less preferably, the reverse link inactivity timer could be places at a non-serving base station in the active set of the mobile terminal, however, this solution would require signaling between the base stations. The status of the timers, including the value or whether they have expired, are communicated to the base station controller. When both timers have expired and no forward link data is queued, the mobile terminal is commanded to transition to a control hold mode where reverse link control channels are gated, reducing interference and increasing system capacity on the reverse link.

In soft handoff, when the mobile terminal selects a new forward link serving base station, the former forward link serving base station may communicate the state and the value of the forward link inactivity timer to the new forward link serving base station, which manages the timer. The reverse link inactivity timer may be transferred as well, or may be maintained by any base station in the active set of the mobile terminal, or at the base station controller.

DETAILED DESCRIPTION OF THE INVENTION

Figure 1:
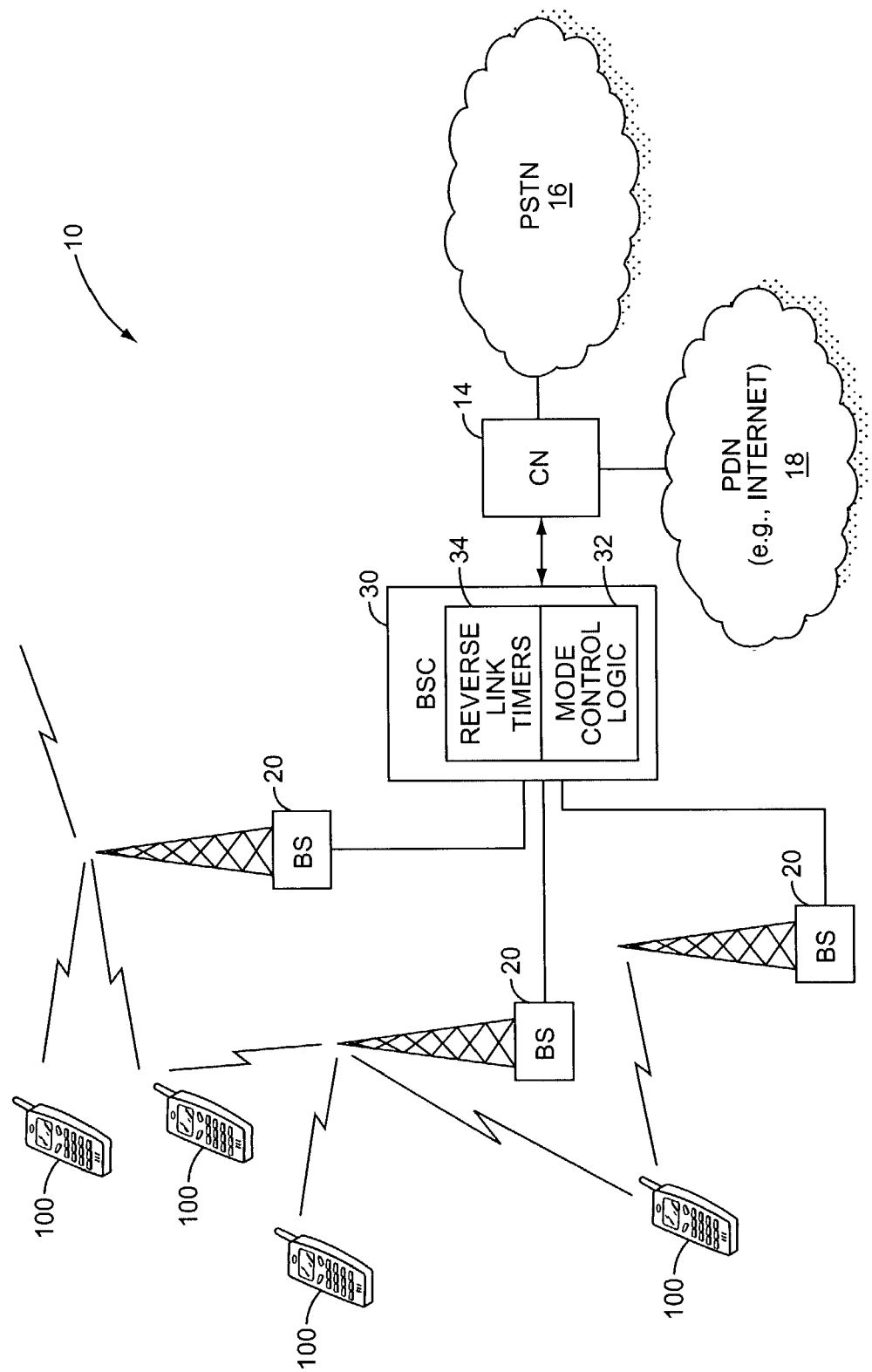
FIG. 1 is a functional block diagram of a mobile communication network.

Referring now to the drawings, the mode control method of the present invention is shown in the context of an IS-2000 mobile communication network, which is indicated generally by the numeral 10. IS-2000 is a communications protocol for code division multiple access (CDMA) radio networks published by the Telecommunications Industry Association (TIA) and the Electronics Industry Association (EIA). FIG. 1 illustrates the logical architecture of a mobile communication network 10 and is not intended to imply a particular physical implementation. The following description is intended to describe how to implement the present invention in an exemplary mobile communication system. Those skilled in the art will recognize that the present invention can be adapted for use in mobile communication systems employing different standards, such as IS-95 in Wideband CDMA (W-cdma) systems.

The mobile communication network 10 includes a plurality of base transceiver stations 20 (referred to herein simply as base stations), one or more base station controllers (BSCs) 30, and a core network 14. Each base station 20 communicates with mobile terminals 100 within its coverage area over an air interface. Each base station 20 is connected to a BSC 30 that supervises the operation of multiple base stations 20. The BSC 30 connects to the core network 14, which provides a gateway to the public switch telephone network (PSTN) 16 and packet data networks 18, such as the Internet. The BSC 30, in the exemplary embodiment of the invention, includes mode control logic 32 to control the operational mode of the mobile terminals 100 in its service area. The BSC 30 may also include reverse link inactivity timers 34, the purpose of which is discussed below.

In current implementations of cdma2000 systems, the reverse link control channels, such as the reverse pilot channel and the reverse rate control channel are transmitted continuously. It has been proposed to reduce interference and hence increase system capacity by introducing a control hold mode for mobile terminals 100 with low transmit activity factors. In the control hold mode, the mobile terminal 100 suspends or reduces transmissions on one or more of the reverse link control channels. The control hold mode is described in the standard Upper Layer (Layer 3) Signaling For cdma2000 Spread Spectrum Systems, TIA/EIA 2000.5—C issued in May 2002.

One method used to determine when mobile terminals 100 should placed in a control hold mode exploits the property of temporal locality. Communications to and from a particular user tend to be grouped in time. A mobile terminal 100 that has very recently sent or received a transmission is more likely to receive or send another transmission in the near term, than is a mobile terminal 100 that has not sent or received a transmission for some time. Following this principle, mobile terminals 100 that have recently received or sent transmissions are maintained in an active mode, and those to and from whom no transmissions have been directed for a predetermined time are commanded to enter a control hold mode. A straightforward manner of implementing this approach is to maintain inactivity timers for each transmission direction, which are loaded with a predetermined value and started upon each successful transmission. Such timers are referred to herein as the forward link inactivity timer and the reverse link inactivity timer.

If an inactivity timer counts down to zero before another transmission in its respective direction, it is said to have expired, or timed-out. If both the forward link and the reverse link inactivity timers for a particular mobile terminal have expired and if there is no data queued awaiting transmission to that mobile terminal 100, the may safely signal the mobile terminal 100 to enter a control hold mode. Traditionally, the BSC 30 maintains and manages both inactivity timers, and controls the operational modes of the mobile terminals 100 within its service area, however, this function could also be performed by other network entities as well.

In some cdma2000 networks, such as 1xEV-DV and 1xEV-DO systems, the forward link is a time-shared channel and the base station transmits to only one mobile terminal at any given time. In systems of this type, a scheduler is usually maintained at each base station 20 to schedule forward link transmissions for all mobile terminals served by that base station 20. When the base station 20 schedules data packets for transmission to a mobile terminal 100, however, the forward link inactivity timer maintained at the BSC 30 may not be started or reset at the proper time, and thus may not accurately reflect the timing of the last forward link transmission to the mobile terminal 100. Maintaining a forward link inactivity timer at the BSC 30 is problematic because the BSC 30 does not know exactly when packet data for a particular mobile terminal 100 are transmitted over the forward link. The data packets may be queued for some time at the serving base station 20. Additionally, the radio link protocol (RLP) uses negative acknowledgement (NACK) signaling between a base station 20 and the BSC 30. Thus, when the BSC 30 forwards packet data to a serving base station 20 for a particular mobile terminal 100, the BSC 30 cannot be assured of a successful transmission until the end of the NACK window. Thus, the BSC 30 maintaining a forward link inactivity timer must delay starting the forward link timer for a defined hold-off period to account for these scheduling and signaling delays. As a consequence, the decision to command a mobile terminal 100 to transition to a control hold mode may be significantly delayed and the mobile terminal 100 will unnecessarily remain in an active mode even though it may be currently inactive.

According to the present invention, the forward link inactivity timer is maintained at the serving forward link base station 20 rather than the BSC 30. The reverse link inactivity timer need not be maintained at the same network entity as the forward link inactivity timer. In an exemplary embodiment, the BSC 30 tracks and controls, through a plurality of base stations 20, communications to and from mobile terminals 100. The BSC 30 additionally decides upon and communicates to the mobile terminals 100 their preferred operational mode, as decided by recent communication activity. In this exemplary embodiment, forward link scheduling to a particular mobile terminal 100 is handled by the serving base station 20, which also maintains the forward link inactivity timer associated with the mobile terminal 100. The reverse link inactivity timer may be maintained by the serving base station 20, by another base station 20 in the active set of the mobile terminal 100, or by the BSC 30. The base station(s) 20 managing the forward and reverse link inactivity timers communicate the value and/or status of the timers to the BSC 30 as required. In particular, the base station(s) 20 signal the BSC 30 when one of the inactivity timers maintained by the base station 20 expires.

Figure 2:
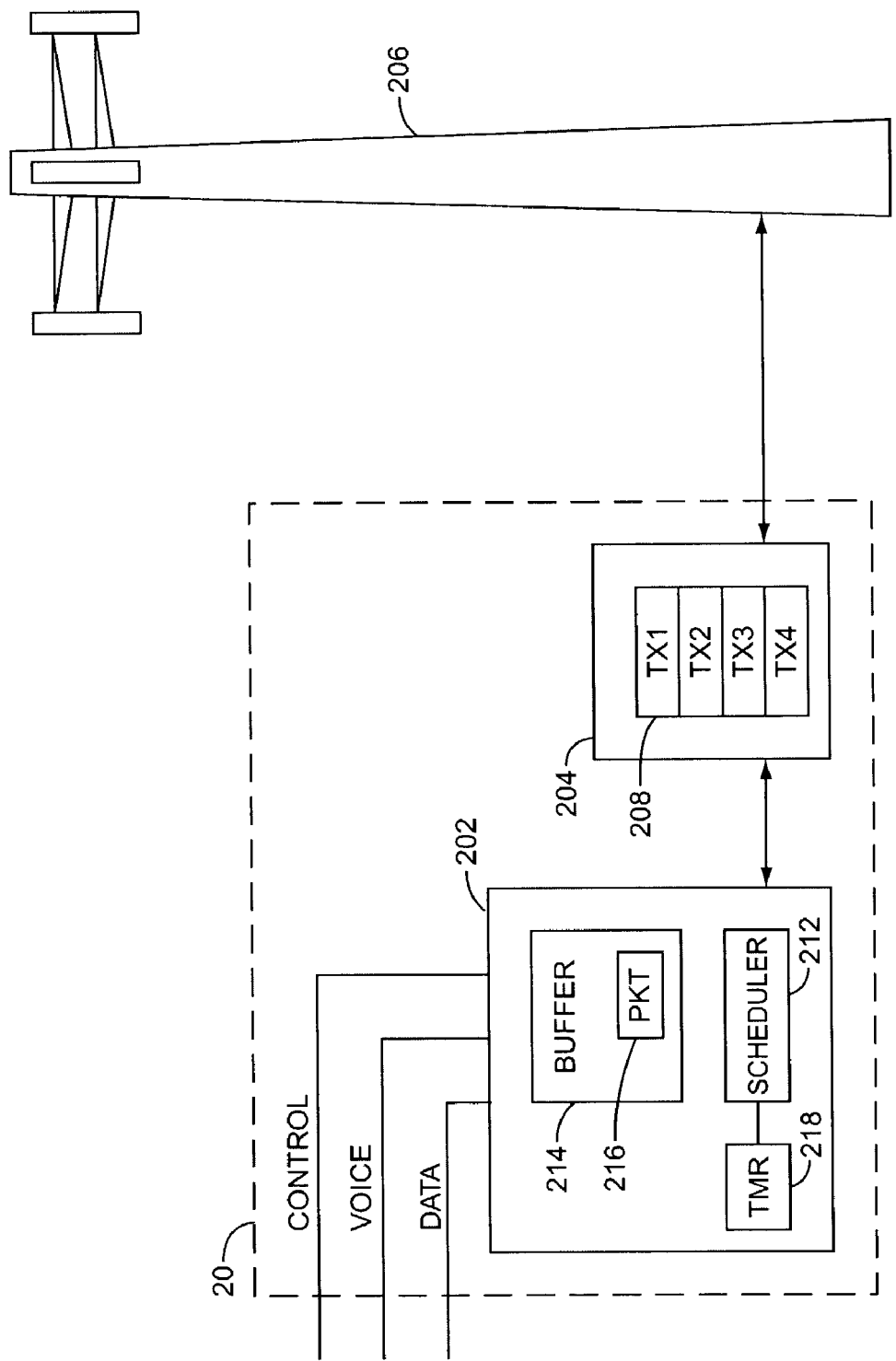
FIG. 2 is a functional block diagram of a base station.

FIG. 2 is a functional block diagram of a base station 20 in accordance with the present invention. The base station 20 includes controller 202, transceiver resources 204, and antenna 206. The transceiver resources 204 include a transceiver array 208 that is coupled to antenna 206 to communicate with mobile terminals 100 in its coverage area. The controller 202 sends and receives voice, data, and control signals to and from the network, and in particular to and from a BSC 30. The controller 202 includes scheduler 212 and buffer memory 214. The controller 202 may, for example, comprise an appropriately programmed processor, controller, or digital signal processor. Buffer memory may be any kind of computer memory, such as RAM. The scheduler 212 schedules transmissions to the mobile terminals 100 over the forward link. The buffer memory 214 stores data packets 216 in a queue prior to transmission to a mobile terminal 100.

According to the present invention, the controller 202 further includes one or more timers 218, each corresponding to a mobile terminal 100 being served by the base station 20. The timers 218 may comprise countdown timers that are independently reset, or loaded with a predetermined value, and thenceforth decrement to zero. A timer 218 may function as either a forward link or reverse link inactivity timer, or have dual timing modes so as to keep track of both forward link and reveries link transmissions. In the case of a forward link inactivity timer, the timer 218 is reset if a data packet 216 is transmitted to the associated mobile terminal 100. The forward link inactivity timer 218 is started when the last acknowledge signal is received from the mobile terminal 100, indicating successful reception of the last data packet 216. That is, the forward link inactivity timer 218 is started upon acknowledgement of the last transmitted data packet. If and when an inactivity timer 218 expires, the controller 202 signals this fact to the BSC 30. Additionally, the controller 202 may communicate the present value or other status of an inactivity timer 218, as appropriate or required. The inactivity timers 218 may comprise dedicated hardware counters, or alternatively may comprise logical timers maintained by software, as will be readily apparent to one of skill in the art.

The operation of the forward and reverse link inactivity timers, and the transition of mobile stations 100 between active and control hold operating modes, is explained with reference to the state diagrams of FIGS. 3 and 4. In an exemplary embodiment of the present invention, as described above, the BSC 30 or other network entity tracks and controls communications to and from mobile terminals 100, and makes decisions as to the operating mode of each mobile terminals 100 based on activity levels. In this embodiment, forward link scheduling to a particular mobile terminal 100 is handled by a serving base station 20, which also maintains the forward link inactivity timer associated with the mobile terminal 100. The reverse link inactivity timer could be maintained at the BSC 30. Alternatively, the reverse link inactivity timer for a given mobile terminal 100 may be maintained at a base station 20 in the active set of the mobile terminal 100, which may or may not be the same base station 20 as the one serving the mobile terminal 100 on the forward link. While FIGS. 3 and 4 are explicated with reference to the configuration of this embodiment, one of skill in the art will readily recognize that the state diagrams are generally applicable to other network configurations.

Figure 3:
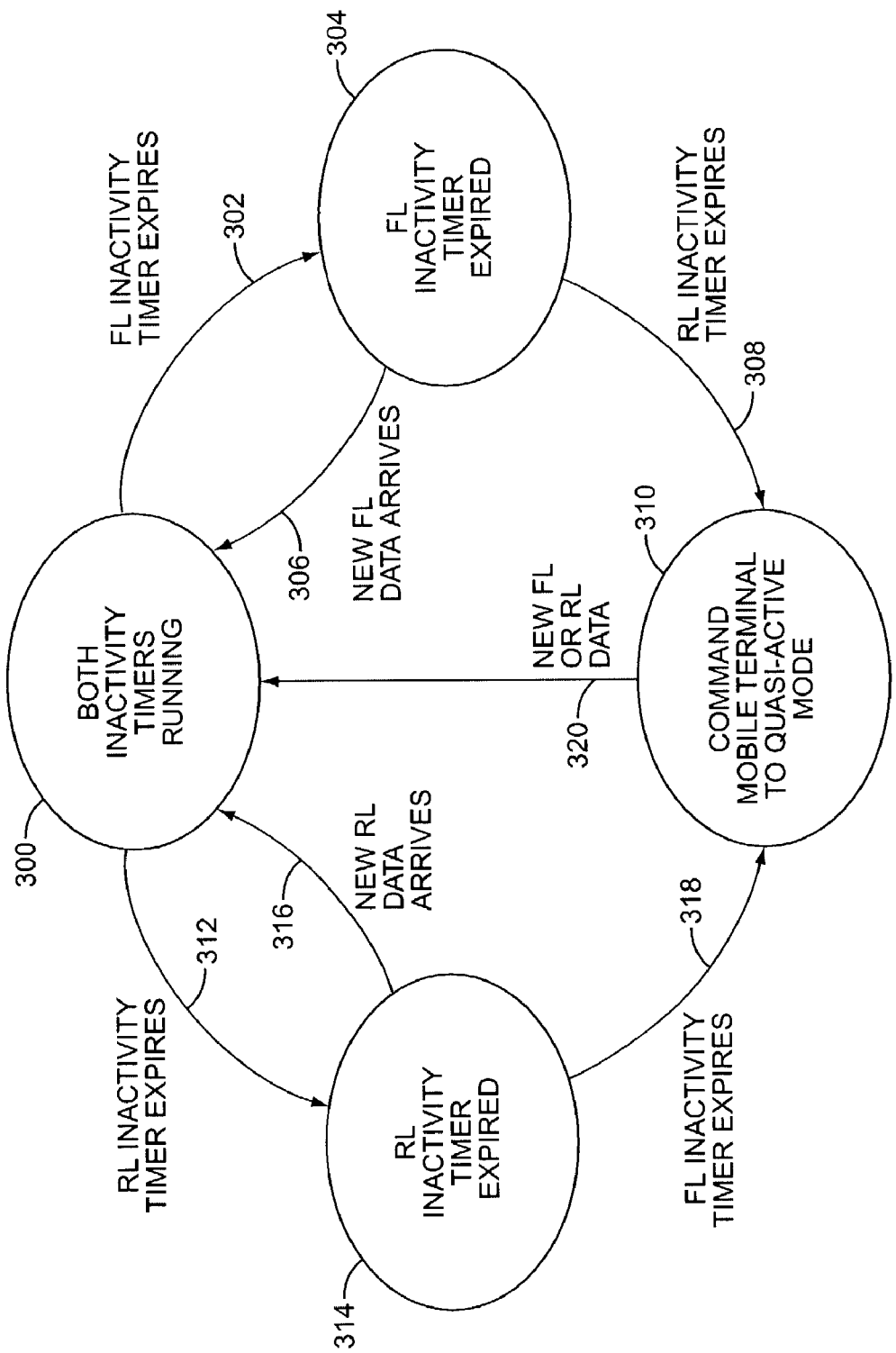
FIG. 3 is a state diagram for managing the operating mode of mobile terminal.

FIG. 3 depicts the state transitions for the BSC 30, as related to a particular mobile terminal 100. Initially, at 300, the mobile terminal 100 is in an active mode, receiving and sending voice and/or data packets through the wireless communication system 10. When the BSC 30 receives an indication that the forward link inactivity timer 218 has expired, it transitions along arc 302 to state 304. If new forward link data arrives for the mobile terminal 100 through the core network 14, the BSC 30 transitions along arc 306 back to state 300 (the forward link inactivity timer 218 will be reset if the selected forward link base station 20 sends a packet to the mobile terminal 100). If no new forward link data arrives, the BSC 30 remains in state 304 until it receives an indication that the reverse link inactivity timer 218 has expired. At that point, it transitions along arc 308 to state 310. At state 310, the mobile terminal 100 is commanded to enter a control hold mode, gating control signals (e.g. reducing or suspending transmissions) on one or more reverse link channels to minimize interference and increase system capacity. In particular, the mobile terminal 100 may transmit at a 50% duty cycle on the reverse pilot channel and/or reverse rate control channels in the control hold mode, or may suspend transmissions altogether on one or both of those channels. Gating may also be applied to other reverse link channels in control hold mode.

Alternatively, the BSC 30 may receive an indication that the reverse link inactivity timer 218 has expired, in which case it transitions along arc 312 to state 314. At state 314, the BSC 30 may receive an indication that the mobile terminal 100 has transmitted new voice or data on the reverse link, in which case the reverse link inactivity timer 218 is reset, and the BSC 30 transitions along line 316 back to state 300. Otherwise, the BSC 30 remains in state 314 until it receives an indication of the expiration of the forward link inactivity timer 218, which causes a transition along arc 318 to state 310. Upon entering state 310, the BSC 30 commands the mobile terminal 100 to transition to the control hold mode. Upon either the arrival of new forward link data for the mobile terminal 100, or the receipt of reverse link data from the mobile terminal 100, the appropriate inactivity timer 218 is reset, the mobile terminal 100 is commanded to enter active mode, and the BSC 30 transitions along line 320 to state 300, where it awaits the expiration of the active timer(s). Note that the mobile terminal 100 is in active mode in states 300, 304, and 314, and is only transitioned to control hold mode in state 310.

Figure 4:
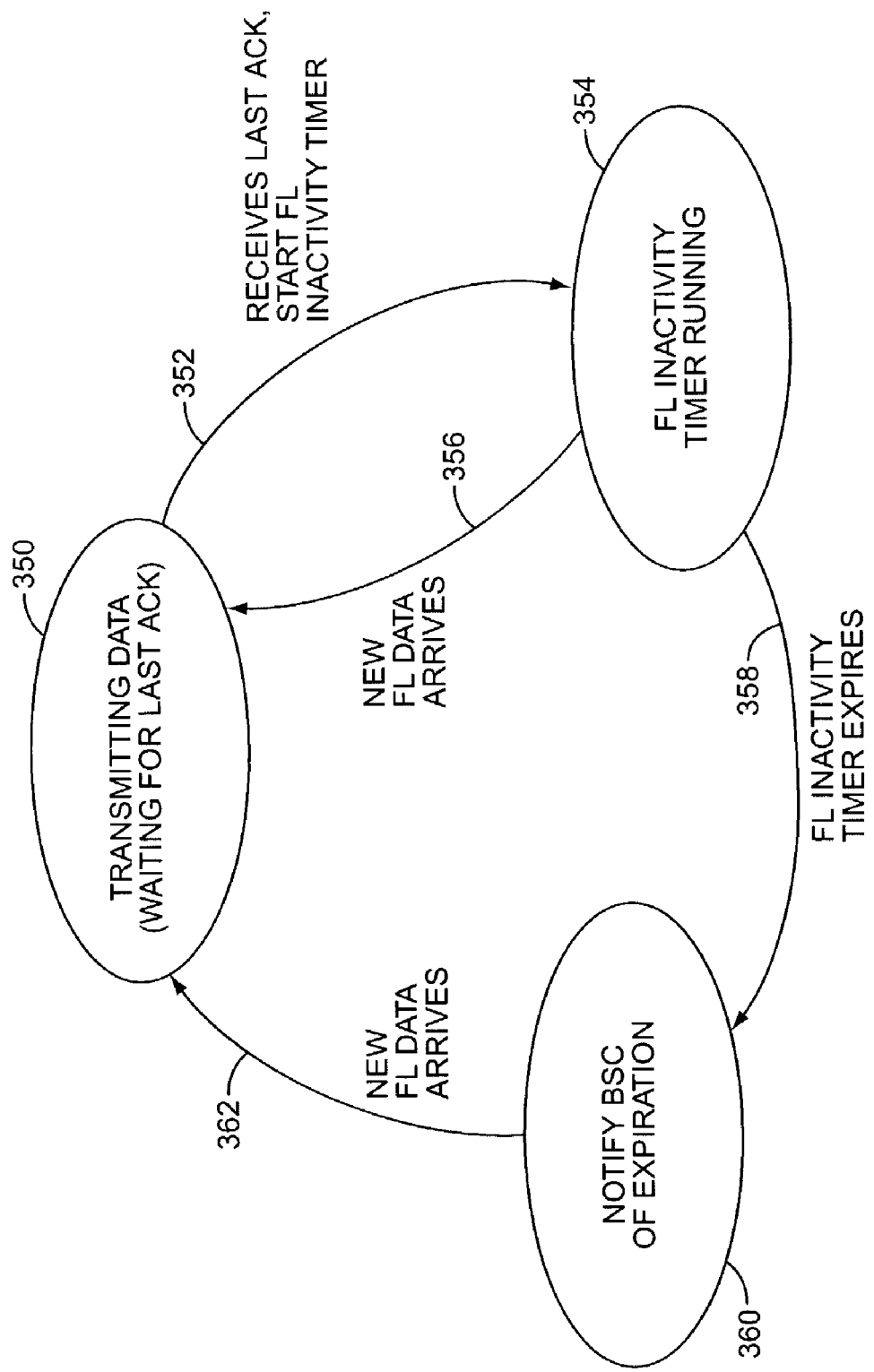
FIG. 4 is a state diagram for managing a forward link inactivity timer.

FIG. 4 depicts the state diagram for the selected forward link base station 20 (or other network entity) maintaining the forward link inactivity timer 218. Upon transmitting one or more data packets to the mobile terminal 100, the selected forward link base station 20 enters state 350, where it waits for the last acknowledgement from the mobile terminal 100, indicating receipt of the last packet. When the last acknowledgement is received, the selected forward link base station 20 transitions along arc 352 to state 354, and starts the forward link inactivity timer 218. If the selected forward link base station 20 receives new forward link data for the mobile terminal 100, it will transition along arc 356 back to state 350. Otherwise, upon the expiration of the forward link inactivity timer 218, the selected forward link base station 20 will transition along arc 358 to state 360, where it will notify the BSC 30 of the expiration of the forward link inactivity timer 218. The selected forward link base station 20 will remain in state 360 (regardless of reverse link activity) until it receives new forward link data intended for mobile terminal 100, at which point it will transition along arc 362 to state 350. The network entity maintaining the reverse link inactivity timer 218 functions analogously.

In the event that a mobile terminal 100 selects a new forward link serving base station 20 while it is in an active state, the former forward link serving base station 20 will communicate the value and status of the forward link inactivity timer 218 to the new forward link serving base station 20. The new forward link serving base station 20 will set up a new forward link inactivity timer 218 and associate it with the mobile terminal 100 (such as in the controller 202). If the forward link inactivity timer 218 was in a reset state at the former forward link serving base station 20 (i.e., the last data packet not yet transmitted), the new forward link serving base station 20 will reset its forward link inactivity timer 218. The new forward link serving base station 20 receives the queued data intended for mobile terminal 100, enters state 350 (see FIG. 5), and begins transmitting data to the mobile terminal 100. If the forward link inactivity timer 218 was running at the former forward link serving base station 20 (i.e., the last data transfer acknowledgement had been received from the mobile terminal 100), the new forward link serving base station 20 will load its forward link inactivity timer 218 with the value communicated from the former forward link serving base station 20, and enter state 354. In either case, the new forward link serving base station 20 will transition among the states depicted in FIG. 4, communicating with the BSC 30 as appropriate. In this manner, the forward link inactivity timer 218 is always maintained by the network entity performing forward link message scheduling, and thus maintains the most accurate inactivity timer status timing and communication.

Since high data rate CDMA systems, such as 1xEV-DV and 1xEV-DO systems, use soft handoff on the reverse link, any base station 20 in the active set of a mobile terminal 100 may maintain the reverse link inactivity timer 218, signaling its status to the BSC 30 as necessary. In particular, maintenance of the reverse link inactivity timer 218 may be transferred to the currently selected forward link serving base station 20 along with the forward link inactivity timer 218, as discussed above. Alternatively, the reverse link inactivity timer 218 may simply be maintained by the same base station 20 for as long as the base station 20 remains in the active set of the mobile terminal 100. As yet another alternative, the reverse link inactivity timer 218 may be maintained by all base stations 12 in the active set or by the BSC 30.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A communication network, comprising:
   a serving base station serving a mobile terminal, said base station including a forward link inactivity timer to monitor packet data transmissions to said mobile terminal on a forward link channel and to generate a first inactivity signal after a predetermined period of inactivity following the last packet data transmission to said mobile terminal on said forward link channel;
   a reverse link inactivity timer to monitor transmissions received from said mobile terminal on a reverse link channel and generate a second inactivity signal when a predetermined period of time has elapsed since the last transmission from said mobile terminal was received on said reverse link channel; and
   a base station controller responsive to said first and second inactivity signals to control an operational state of the mobile terminal.

2. The communication network of claim 1 wherein the base station controller includes the reverse link inactivity timer.

3. The communication network of claim 1 wherein the serving base station includes the reverse link inactivity timer.

4. The communication network of claim 1 including one or more non-serving base stations.

5. The communication network of claim 4 wherein at least one non-serving base station includes the reverse link inactivity timer.

6. The communication network of claim 1 wherein the serving base station schedules the packet data transmissions to said mobile terminal over the forward link communication channel.

7. The communication network of claim 1 wherein base station starts the forward link inactivity timer after transmitting one or more data packets to the mobile terminal.

8. The communication network of claim 1 wherein the base station starts the forward link inactivity timer after the mobile terminal acknowledges receipt of the transmitted data packets.

9. The communication network of claim 1 wherein the base station controller commands the mobile terminal to change operational states based on the first and second inactivity signals.

10. The communication network of claim 1 wherein the base station controller commands the mobile terminal to change to a control hold state after both the forward link and reverse link inactivity timers have expired.

11. A method of controlling the operational state of a mobile terminal, said method comprising:
    monitoring forward link transmission on a forward link channel at a serving base station serving the mobile terminal;
    generating a first inactivity signal at the serving base station after a predetermined period of inactivity has elapsed since the last packet data transmission to said mobile terminal on said forward link channel;
    monitoring transmissions received from said mobile terminal on a reverse link channel;
    generating a second inactivity signal when a predetermined period of time has elapsed since the last packet data transmission from said mobile terminal was received on said reverse link channel; and
    controlling the operational state of the mobile terminal by the base station controller responsive to the first and second inactivity signals.

12. The method of claim 11 wherein monitoring transmissions received from said mobile terminal on a reverse link channel is performed by a base station controller.

13. The method of claim 11 wherein monitoring transmissions received from said mobile terminal on a reverse link channel is performed by the serving base station.

14. The method of claim 11 wherein monitoring transmissions received from said mobile terminal on a reverse link channel is performed by a non-serving base station.

15. The method of claim 11 further comprising scheduling forward link transmissions to said mobile terminal over a time-shared communication channel at said serving base station.

16. The method of claim 15 wherein monitoring forward link transmissions at a serving base station serving the mobile terminal comprises starting a forward link inactivity timer after transmitting one or more data packets to the mobile terminal.

17. The method of claim 11 wherein monitoring forward link transmission at a serving base station serving the mobile terminal comprises starting a forward link inactivity timer after the mobile terminal acknowledges the last packet data transmission on the forward link channel.

18. The method of claim 11 wherein controlling the operational state of the mobile terminal by the base station controller responsive to the first and second inactivity signals comprises sending control signals from the base station controller to the mobile terminal commanding the mobile terminal to transition to a control hold mode.

* * * * *